United States Patent [19]

Tulpule et al.

[11] Patent Number: 5,652,886
[45] Date of Patent: Jul. 29, 1997

[54] SYSTEM FOR LOADING A BOOT PROGRAM INTO AN INITIALLY BLANK PROGRAMMABLE MEMORY OF A MICROPROCESSOR USING STATE MACHINE AND SERIAL BUS

[75] Inventors: Bhalchandra R. Tulpule, Farmington; Mark A. Foss, Wethersfield; Edward J. Kysar, III, Burlington; Edward M. Oscarson, New Hartford; Leonard Spain, Enfield, all of Conn.; Michael C. Crisafulli, Binghamton, N.Y.

[73] Assignee: United Technologies Corporation, Windsor Locks, Conn.

[21] Appl. No.: 317,975

[22] Filed: Oct. 3, 1994

[51] Int. Cl.$^6$ .................................................. G06F 13/00
[52] U.S. Cl. .......................... 395/652; 395/651; 395/828; 395/701
[58] Field of Search ..................... 395/450, 451, 395/452, 739, 651, 652, 653, 280, 286, 828, 830, 843, 182.13, 182.11, 182.21, 183.06, 185.01, 185.02, 185.03, 185.04, 800, 700

[56] References Cited

U.S. PATENT DOCUMENTS

| | | | |
|---|---|---|---|
| 4,430,704 | 2/1984 | Page et al. | 395/700 |
| 5,063,536 | 11/1991 | Tinder et al. | 395/775 |
| 5,068,780 | 11/1991 | Bruckert et al. | 395/700 |
| 5,381,538 | 1/1995 | Amim et al. | 395/425 |
| 5,408,666 | 4/1995 | Menut et al. | 395/700 |
| 5,491,790 | 2/1996 | Keeley et al. | 395/183.12 |
| 5,493,667 | 2/1996 | Hock et al. | 395/452 |

FOREIGN PATENT DOCUMENTS 0476195  9/1990  European Pat. Off. ........ G06F 9/445

OTHER PUBLICATIONS

"Network Control Program Buffer Management via Finite State Machines", IBM Technical Disclosures Bulletin, Aug. 1992, vol. 35, p. 235.

"Technique for Controlling Chip Power On Reset", IBM Technical Disclosures Bulletin, Jul. 1993, vol. 36, pp. 453–456.

"Built-In Self-Test Architecture", IBM Technical Disclosures Bulletin, May 1990, vol. 32, pp. 448–451.

"Storage Subsystem Request Finite State Machine", IBM Technical Disclosures Bulletin, Jun. 1989, vol. 32, pp. 407–409.

Technical Brief by Atmel Corp., "Integrated Flash Memory" describing a process for programming reprogrammable chips using a flash memory with a controller isolated during reprogramming.

Primary Examiner—Meng-Ai T. An

[57] ABSTRACT

A state machine has specific states to boot a microprocessor and retrieve data from the microprocessor's memories while the microprocessor is running, but with operation temporarily suspended under control of the state machine. The state machine is programmed after it is installed on a circuit board with the microprocessor. The state machine is connected to a standard bus and through its specific states provides an interface to the microprocessor as well as the instructions for booting the microprocessor when the microprocessor is powered up.

11 Claims, 3 Drawing Sheets

SYSTEM FOR LOADING A BOOT PROGRAM INTO AN INITIALLY BLANK PROGRAMMABLE MEMORY OF A MICROPROCESSOR USING STATE MACHINE AND SERIAL BUS

TECHNICAL FIELD

This invention relates to microprocessors, particularly booting and programming microprocessors.

BACKGROUND OF THE INVENTION

In any processor based system, a non-volatile program—the so-called "boot" program—is always present. The boot program may be used to load the main program or combined with the main program in the non-volatile program memory. In either case, the boot program enables the processor to start initial operations properly when power is first applied. In the absence of a boot program, the processor would begin operating in an unknown state and eventually become "lost". The boot program is designed to be placed on the processor board at the time of manufacture. In that way, it is always accessible to the processor at power up.

This approach, routinely used in the prior art, can be improved in a number of respects, not the least of which is the cost. First, there is a recurring cost for the manufacturing steps to copy the boot program onto a general (empty) non-volatile memory chip and then placing the chip on the printed circuit board. Following conventional technology, the non-volatile memory is a core type or UV type memory requiring special equipment and carefully designed process steps that protect the memory during the manufacturing steps. These memories have to be removable, calling for separate sockets and board area and increasing manufacturing cost. In most applications, these boot memories are segregated to protect them from corruption by the application programs, calling for more board space.

Prior approaches also involve several non-recurring expenses in the design of the hardware and manufacturing processes, but a significant cost is occasioned in the development of the boot program, a program that is unique for each processor and specially adapted to meet each application's specific initialization requirements. This indispensable customizing usually leads to a proliferation of boot programs for all systems, all different, all needing maintenance and program support, and that naturally adds to the cost.

With the development of the EEPROM and Flash memory technologies, it is possible to eliminate memory sockets and to manufacture hardware with blank board-mounted memories. These memory devices can be externally programmed. One programming technique uses card edge connectors to enter memory instructions. This is expensive. Since these types of memory devices can be repeatedly programmed, the capability does exist to load application programs (with the help of the boot program executed by the processor) from a location outside the box, so to speak, over a simple bus/receiver, such as RS-232 or RS-422 protocol buses. However, clearly, the boot program itself cannot be loaded in this manner on to bare board with blank memories, because of the lack of the boot program.

In many real time intensive applications, the capability to monitor and deposit parameters of interest while the application program is running can be important. Typically, this task is performed by the boot program or a subsequently loaded program, sometimes called the "Software Development Package" (SDP) program. However, the real-time penalties with SDP programs are unacceptable in many situations, meaning that monitoring and updating are usually performed as background tasks, naturally at much slower rates.

DISCLOSURE OF THE INVENTION

An object of the invention is to satisfy the need for a boot function that reduces the costs associated with the prior art techniques and provides the ability to externally program, monitor and alter the application programs in a computer system.

An object of the present invention is to provide a way to fabricate a board containing a microprocessor containing a generic programmed boot engine, generic in that it can be used with a variety a microprocessors that may be placed on the circuit board. In this way, a manufacturer can preassemble all boards with the microprocessor engine of choice, then program the program memory after the board is fully assembled without using memory clips and connectors.

Another object of the present invention is eliminating external connections to the boot program memory after the board is assembled. Still another object is to interrogate any processor on the board without interrupting the operation of the application program.

According to the invention, a microprocessor and its memory units are assembled on a circuit board with a boot state machine having a finite number of states that perform basic boot and programming and data interrogation operations. Programming instructions are sent via a serial bus, as n bit words, to the boot state machine. The instructions control the state of the state machine, and, depending on the states, the state machine performs fundamental tasks that are equivalent to those performed by a boot program. These include managing the bus protocol and transferring data to and from the microprocessor's memory input/output (I/O) ports.

Other objects, benefits and features of the invention, in addition to those set forth above, will be apparent to one skilled in the art from the explanation that follows.

BEST MODE FOR CARRYING OUT THE INVENTION

Figure 1:
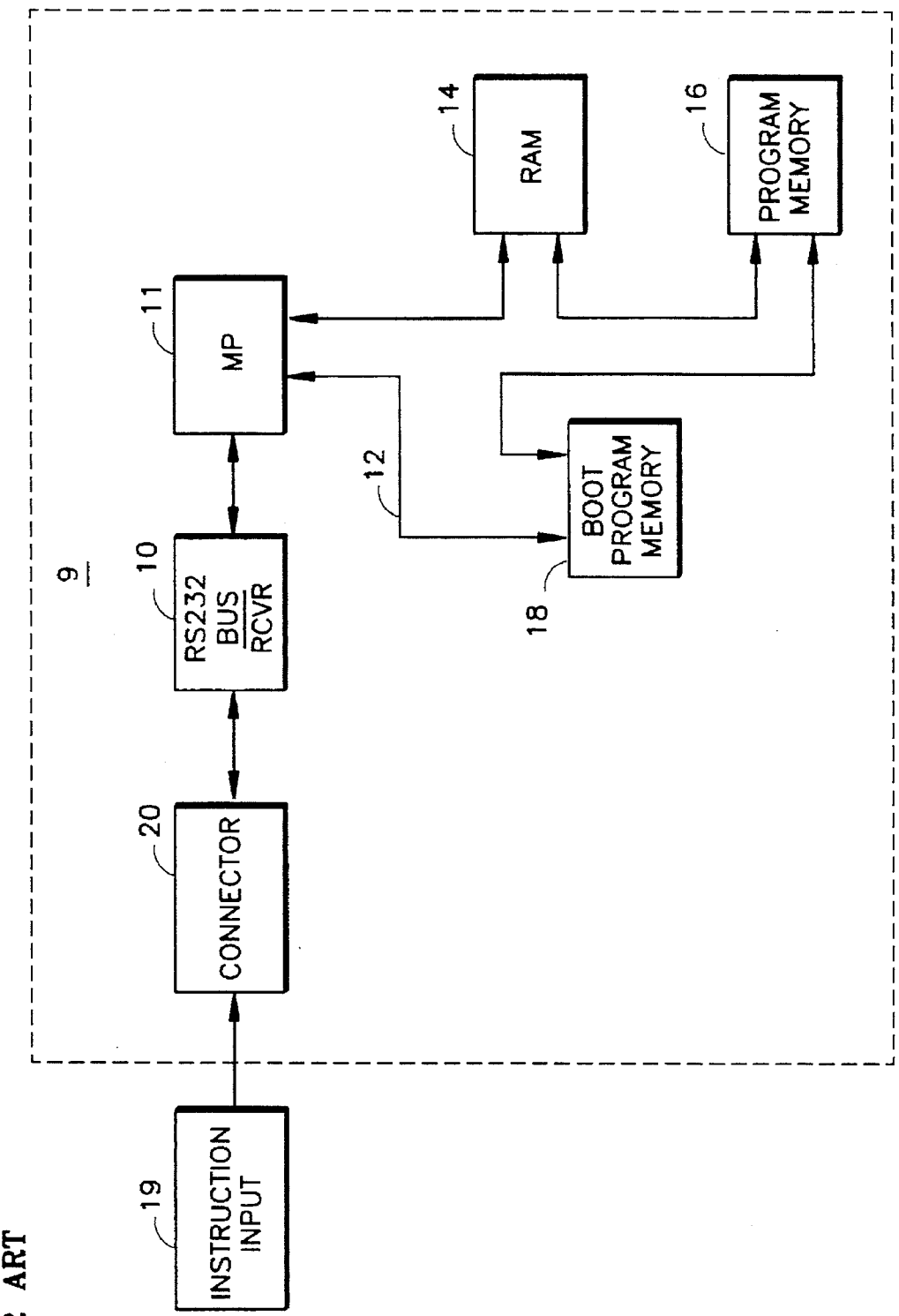
FIG. 1 is a simplified block diagram of prior art microprocessor system that would be assembled on a circuit board.

The prior art circuit shown in FIG. 1 should be assumed to be mounted on a printed circuit board 9' containing a microprocessor MP 11' and numerous other ancillary components, but only those components that are germane to the invention are shown. The microprocessor MP 11' is connected to a standard RS-232 input bus/receiver 10' (RCVR) and by another bus 12' to a RAM (volatile memory) 14', an EPROM 16' (program memory) containing "program instructions" (as opposed to boot instructions) and another EPROM 18' (boot memory) containing boot instructions specific to the processor. The RAM 14' provides a temporary (scratch pad) memory for the microprocessor. It is rudimentary understanding today that the program memory 16' stores the machine coded instructions that are used by the microprocessor to carry out specific operations and functions for a particular application. The programs are read into the program memory 16' through the microprocessor after the program memory is installed on the circuit board 9'. The program instructions are entered externally from a program instruction unit 19' over a connection (mechanical clip) 20' because the program memory must, for practical purposes, he empty when it is placed on the circuit board. The boot program memory 18', on the other hand, is typically programmed first, then placed on the board during the manufacturing process, which creates the obvious risk that the memory may be damaged. The boot program in the boot memory 18' is specific to the type of code required for the processor. They must be matched.

Figure 2:
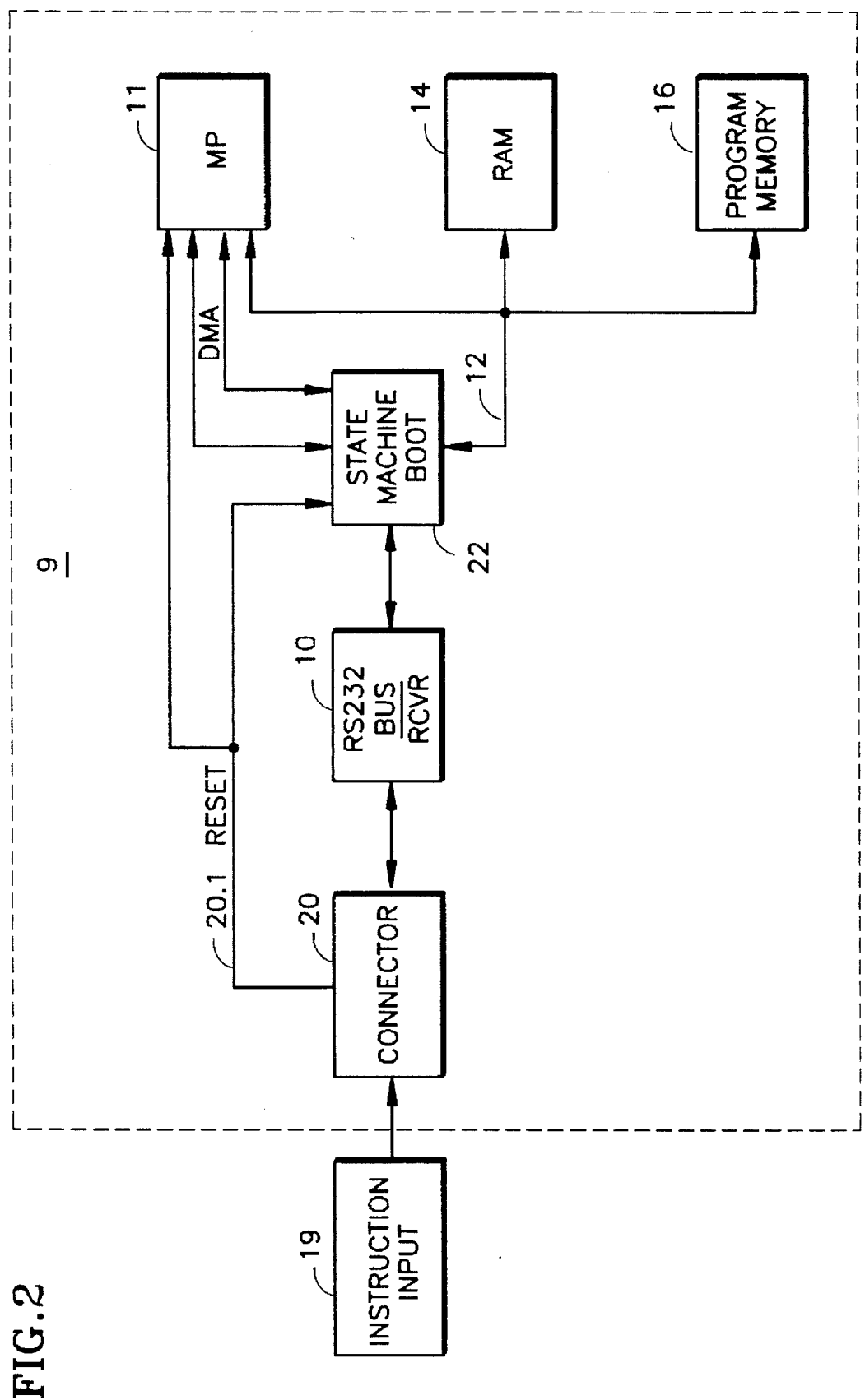
FIG. 2 is a simplified block diagram of a microprocessor based system embodying the present invention.
Figure 3:
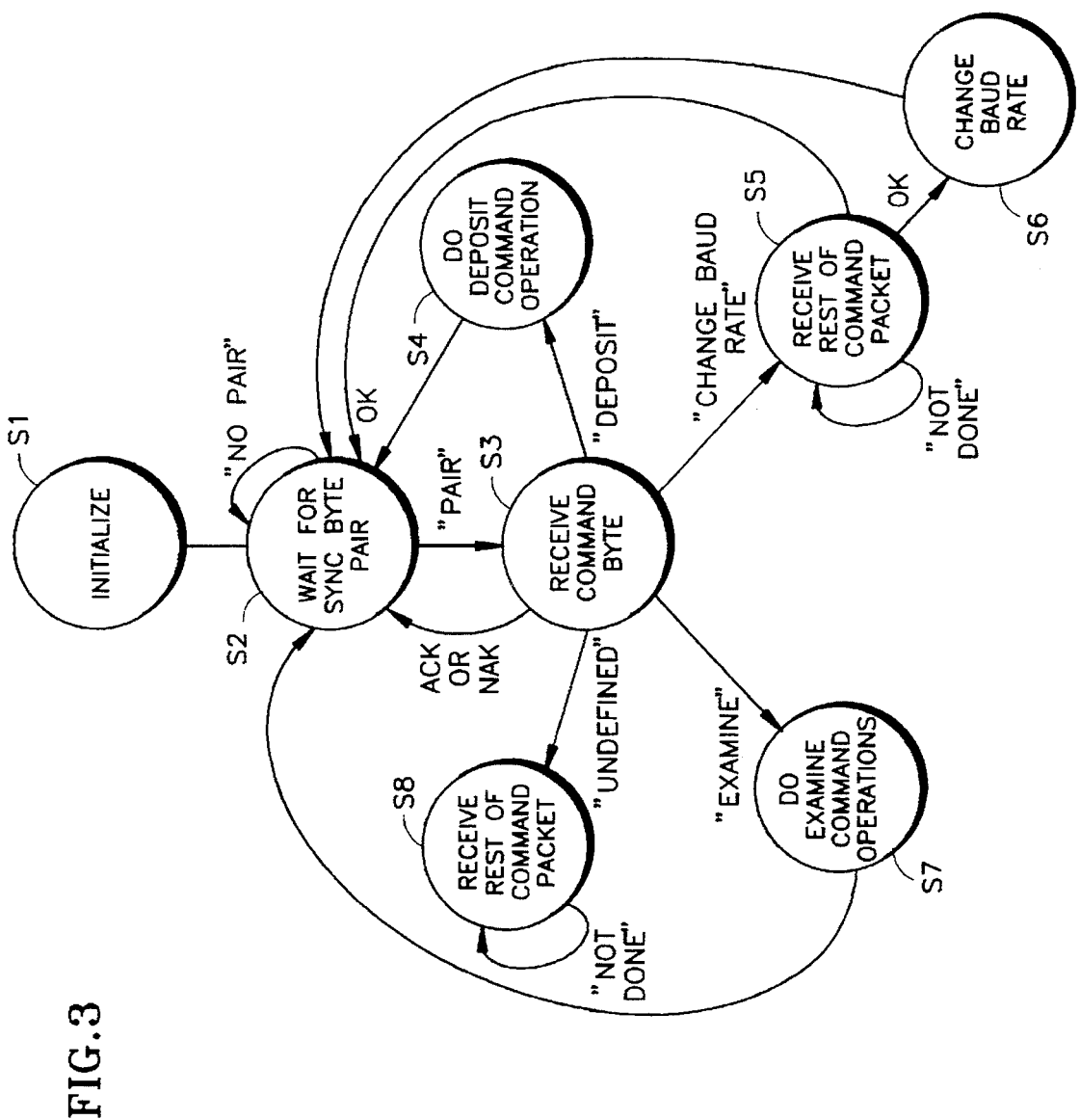
FIG. 3 is a state diagram showing boot states for a state machine that is part of the system shown in FIG. 2.

Turning to FIG. 2, which illustrates an embodiment of the invention, there some of the same components are present. The program memory 16 is empty when placed on the board 9, waiting for entry of program instructions, but the circuit in FIG. 2 includes, between the bus 10, the microprocessor MP 11, and the program memory 16, and RAM 14, a so called "state machine" 22. The bus 10 does not connect with the microprocessor MP; it goes to the state machine 22, which performs instructions, based on its state, by interacting with the program memory 16 which is an EPROM and RAM 14 memories over bus 12. State machines are well known, differing from a microprocessor in several ways. A state machine 22 has a finite number of stable states, each accessed as a function of the state of inputs to the state machine 22. This makes it very fast and deterministic. Since the machine 22 does not follow a program, it has greater speed but less sophistication than the microprocessor. The state machine 22 is intended to have very limited capabilities in the circuit in FIG. 2. It has discrete states to start the microprocessor—boot it up. It is intended to have sufficient states to allow for receiving application program instructions over the RS232 bus and for loading them into the EPROM 16, at a minimum. In other words, when power is applied to all the components in the circuit, the state machine will automatically enter a state. Referring to FIG. 3, in one state, entered by a command on the bus, the state machine is ready to receive data from peripheral devices and load it into the RAM and program memory over bus 12. The microprocessor MP is not involved in this process, being disabled by a reset command, externally supplied. The state machine is capable of having a limited number of states to output data on the bus 12, a potent feature because it eliminates a requirement for any action by the microprocessor. Over a line 20.1, a reset signal (RESET) is provided externally to the microprocessor MP and the state machine 22. This signal also restarts the microprocessor following a program load operation by the state machine. The programming states and instructions for the state machine are independent of the microprocessor since the state machine, not the processor, serves as the node for interrogating the program memory.

FIG. 3 shows an illustrative state diagram for the state machine 22. State S1, an initialization state, is entered when power is applied; following that the state machine 22 enters state S2, where the state machine input on the bus 10 is monitored for a synchronization byte pair (sync. byte pair) in an n bit input. It stays in that state as long as there is no sync. byte pair present. When the pair is present, the state machine moves to state S3, where it receives a command byte, telling it what to do (the next state). A "deposit command", for instance, causes the state machine 22 to enter state S4, where the state machine simply executes the command, e.g., deposits the instruction in the appropriate memory. It then returns to state S2. The command byte may call for another state S5 when the command byte instructs "change baud rate". At state S5, the machine 22 waits for the balance of that command set. If the command set is correct, the baud rate is set at state S6, and the machine returns to S2. If the command set is not correct, the machine returns directly to state S2. To examine command operations while the processor is operating (not in a reset mode), the state machine 22 can enter state S7 in response to an "examine" command, allowing data identified by the examine command to be retrieved by executing DMA (Date Memory Address) requests to the microprocessor and fetching the data when the microprocessor grants access time. From state S7, the machine again returns to state S2. At state S3, an "undefined" command produces state S8, which allows the remainder of the command packet associated with the command byte to be received but not used. Once the packet is received at state S8, the state machine again returns to state S2 after sending the data out on bus 10. Between states S2 and S3, acknowledge (ACK) and no-acknowledge (NAK) protocol is provided, a handshake to indicate that the "sync byte pair has been received and state S3 has been entered.

The input to the state machine from the bus 10 is the mentioned "command packet", which is discussed here to illustrate one approach in controlling the state machine according to the invention. It is believed important to emphasize that the command language per se is not an essential feature to the invention; any structure suitable for the input bus and recognizable by the state machine is all that is called for to be able to program the state machine externally to boot the microprocessor. The examples provided in this discussion have been used in connection with the RS-232 bus protocol. The basic structure of the command packet consists of a sync block followed by a command block, then a checksum of the command block. First, the start of a command packet is indicated by two synchronization bytes. Second, the command block contains the basic "Software Development Package" (SDP) command and the byte count, followed by the data bytes defined for the particular command. The last byte of the command packet is the checksum of all the bytes in the command block, for data transmission integrity. In other words, the standard format for all command packets may be as follows: SYNC/SYNC/COMM/BCNT/DATA/DATA/ . . . /CSUM, where, SYNC is the first two bytes sent in each command packet for synchronization; COMM is the third byte in the command packet and is always a command. As noted before, this byte (word) defines the type of operation that is to be performed using the data transmitted in the packet. BCNT, the fourth byte in the command packet, is a count of data bytes before the checksum (CSUM). DATA, the fifth byte, is dependent on the nature of the COMM byte. Some commands, may use DATA to identify a target (i.e. address) rather than data. CSUM, the last byte in the standard format, is the modulo $2^8$ checksum of the command byte, byte count byte and all data bytes.

As mentioned before, between states S2 and S3, a handshake takes place, in the form of a response packet. The typical response packet consists of acknowledgement (ACK) and no acknowledgement (NAK) packet and, as an option, a command reply. As before, the ACK/NAK packet being with a sync byte block followed by the ACK/NAK code. The basic structure of the command reply packet is similar to the structure of the command packet, having this structure SYNC/SYNC/OPCD/BCNT/DATAT/DATA/ . . . CSUM.

Aided by this discussion of the best mode for carrying out the invention, one skilled in the art may make modifications to the invention, in whole or in part, without departing from its true scope and spirit.

We claim:

1. An apparatus for loading a boot program for a microprocessor comprising:

a programmable memory, initially being blank prior to loading the boot program, for storing the boot program;

a microprocessor which is booted up from the boot program;

a first bus for transferring data, said first bus connecting said programmable memory and said microprocessor;

a serial bus connected to an external source for receiving the boot program from the external source; and a state machine connected to said serial bus for receiving the boot program, said state machine connected to said first bus wherein said state machine has a plurality of states selectable by the external source and wherein one of said selectable states is a state for loading the boot program received from the external source into said programmable memory initially being blank prior to loading the boot program, and prior to said microprocessor being booted up and wherein upon completion of loading the boot program said microprocessor is booted up from the boot program stored in said programmable memory.

2. The apparatus of claim 1 wherein said programmable memory is an EEPROM.

3. The apparatus of claim 1 comprising said programmable memory capable of storing a boot program initially having an inoperable boot program.

4. The apparatus of claim 1 further comprising:

said state machine having an externally selectable state for setting a transfer rate for the boot program.

5. The apparatus of claim 1 further comprising:

said state machine having an externally selectable state for reading data from said programmable memory for transfer to the external source while suspending action by said microprocessor.

6. The apparatus of claim 1 further comprising:

a random access memory connected to said first bus for connecting said random access memory to said microprocessor, said state machine and said programmable memory.

7. The apparatus of claim 1 wherein said serial bus is an RS-232 bus.

8. The apparatus of claim 1 wherein said state machine, said program memory, and said microprocessor each has a unique address, selectable by the external source.

9. The apparatus of claim 1 further comprising:

a reset line for initiating booting up of said microprocessor from the boot program stored in said programmable memory after the boot program has been loaded in said programmable memory from said external source, said external source issuing a reset signal via said reset line.

10. A method of programming an apparatus having a programmable memory for storing a boot program, said programmable memory initially being blank before loading the boot program, a microprocessor which is booted up from the boot program, a state machine having a plurality of states selectable by an external source, a first bus connecting said programmable memory, said microprocessor, and said state machine, and a serial bus for connecting the external source to said state machine, the method comprising;

connecting said external source to said serial bus;

selecting via said external source one of said plurality of states of said state machine for loading the boot program into said programmable memory;

transferring and storing the boot program from said external source to said programmable memory initially being blank prior to loading the boot program through said state machine prior to said microprocessor being booted up;

removing said external source upon completion of loading the boot program; and booting up said microprocessor from the boot program stored in said programmable memory.

11. The method of claim 10 comprising:

selecting via said external source a state of said state machine for changing a transfer rate for the boot program.

* * * * *